United States Patent
Matsumoto

(10) Patent No.: US 7,620,224 B2
(45) Date of Patent: Nov. 17, 2009

(54) IMAGE DISPLAY METHOD AND IMAGE DISPLAY PROGRAM

(75) Inventor: Kazuhiko Matsumoto, Minato-ku (JP)

(73) Assignee: ZIOSOFT, Inc., Tokyo (JP)

( * ) Notice: Subject to any disclaimer, the term of this patent is extended or adjusted under 35 U.S.C. 154(b) by 629 days.

(21) Appl. No.: 11/105,647

(22) Filed: Apr. 14, 2005

(65) Prior Publication Data
US 2006/0056681 A1 Mar. 16, 2006

(30) Foreign Application Priority Data
Aug. 11, 2004 (JP) ............................. 2004-234357

(51) Int. Cl.
*G06K 9/00* (2006.01)
(52) U.S. Cl. ................ 382/128; 382/131; 600/407; 600/416
(58) Field of Classification Search ............... 382/128, 382/131, 132; 250/363.04; 600/407, 416
See application file for complete search history.

(56) References Cited

U.S. PATENT DOCUMENTS

| | | | | |
|---|---|---|---|---|
| 5,891,030 A * | 4/1999 | Johnson et al. | ............. | 382/128 |
| 6,083,162 A * | 7/2000 | Vining | ................. | 600/407 |
| 6,511,426 B1 * | 1/2003 | Hossack et al. | ............. | 600/437 |
| 6,807,292 B1 | 10/2004 | Goto et al. | | |
| 6,842,638 B1 * | 1/2005 | Suri et al. | ............. | 382/131 |
| 2002/0172408 A1 * | 11/2002 | Saito et al. | ............. | 382/132 |
| 2005/0018892 A1 * | 1/2005 | Pieper et al. | ............. | 382/131 |
| 2007/1000313 * | 1/2007 | Kaufman | ............. | 382/128 |

FOREIGN PATENT DOCUMENTS

| | | |
|---|---|---|
| JP | 10-31761 | 2/1998 |
| JP | 11-318884 | 11/1999 |
| JP | 2004-215846 | 8/2004 |

OTHER PUBLICATIONS

Kanitsar et al., CPR—Curved Planar Reformation, Oct. 27, 2002, IEEE Visualization 2002, pp. 37-44.*
Barthold Lichtenbelt et al., "Introduction to Volume Rendering", 1998, Chapter 6, pp. 121- 138.
A. Vilanova Bartoli et al., "Virtual Colon Unfolding", 2001.

* cited by examiner

*Primary Examiner*—Bhavesh M Mehta
*Assistant Examiner*—Daniel Zeilberger
(74) *Attorney, Agent, or Firm*—Pearne & Gordon LLP

(57) ABSTRACT

A path 22 representing the center line of a curved cylinder 21 is acquired (step S1). The path 22 can be set by a GUI while a volume rendering image displayed on a display device is viewed. Alternatively, the path 22 can be set automatically when the curved cylinder 21 is designated as a subject of observation. Then, a region of the curved cylinder 21 is extracted as a subject pf observation with the path 22 used as the center (step S2). Then, sections 23 and 24 are generated as if the extracted region was cut open along the path 22 (step S3). In this case, the sections 23 and 24 are curved along the curvature of the curved cylinder 21. Accordingly, CPR images are synthesized on the curved sections (step S4).

15 Claims, 13 Drawing Sheets

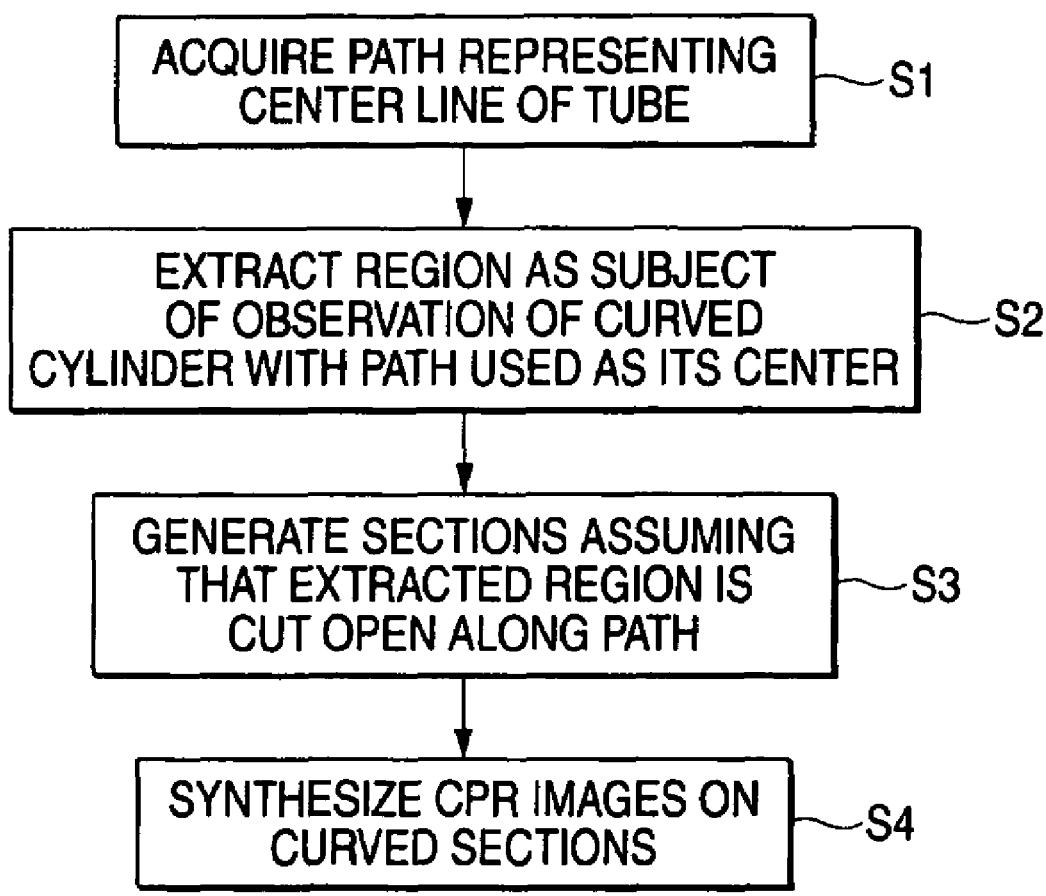

CPR (CURVED MPR)

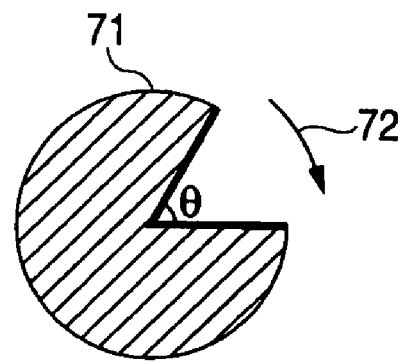
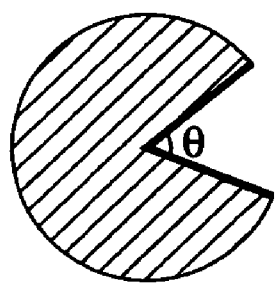
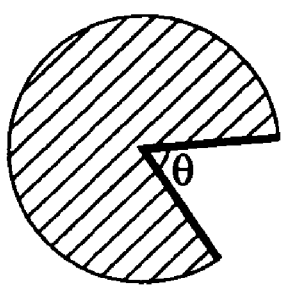
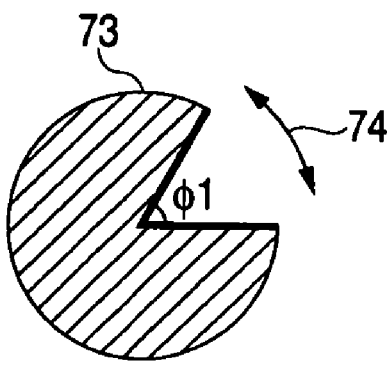
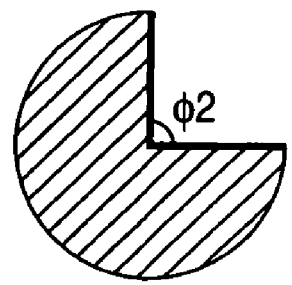
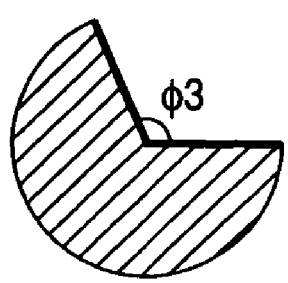

DISPLAY COLON BY
RAY CASTING METHOD

PRIOR ART

PRIOR ART

PRIOR ART

DISPLAY OF ARBITRARY SECTIONAL
PLANE OF VOLUME BY
MPR (MULTI PLANAR RECONSTRUCTION)

PRIOR ART

TECHNICAL TERMS FOR REGIONS

PRIOR ART

IMAGE DISPLAY METHOD AND IMAGE DISPLAY PROGRAM

This application claims foreign priority based on Japanese Patent application No. 2004-234357, filed Aug. 11, 2004, the contents of which is incorporated herein by reference in its entirety.

BACKGROUND OF THE INVENTION

1. Field of the Invention

The present invention relates to an image display method and an image display program for visualizing a tubular tissue.

2. Description of the Related Art

The advent of CT (Computed Tomography) and MRI (Magnetic Resonance Imaging) making it possible to observe the internal structure of a human body directly with the development of image processing technology using a computer has led to an innovation in the medical field, and medical diagnosis using a tomographic image of a living body is widely performed. In addition, as an example of technology for visualizing the three-dimensional structure of the inside of a human body which is too complex to be understood with only a tomographic image, volume rendering for drawing an image of a three-dimensional structure directly from three-dimensional digital data of an object obtained by CT has been used in medical diagnosis in recent years.

There are variations of volume rendering other than ray casting, such as MIP (Maximum Intensity Projection) MINIP (Minimum Intensity Projection), MPR (Multi Planar Reconstruction) and CPR (Curved Planar Reconstruction) In addition, two-dimensional slicing image or the like is generally used as two-dimensional image processing.

Volume data used in volume rendering is a three-dimensional array of "voxels", which are three-dimensional pixels of cubic body. A specific value expressing the characteristic of a voxel is referred to as "voxel value". The volume data is obtained from a collection of two-dimensional cross-sectional images of a target object, such as a body of a patient. Particularly in a CT image, the voxel value represents x-ray attenuation coefficient at the position covered by the voxel, and each voxel value is referred to as "CT value."

Ray casting is a known technique for volume rendering. In ray casting, a virtual ray is emitted from a projection plane onto an object, and the light reflected from the inside of the object is computed. A two-dimensional image is generated by calculating the reflected light projected onto each pixel on the projection plane. For example, refer to "Introduction To Volume Rendering", written by Barthold Lichtenbelt, Randy Crane, and Shaz Naqvi, Hewlett-Packard Professional Books (published in 1998) Chapter 6, pg. 121-138.

FIG. 9 shows a colon displayed by the ray casting method as an example of the visualization of a tubular tissue inside a human body. As shown in FIG. 9, by using the ray casting method, an image in which the three-dimensional structure of the colon is seen through can be formed from a two-dimensional tomographic image data sequentially obtained along a direction perpendicular to a tomographic image plane of the abdomen.

FIGS. 10A and 10B are illustrations showing the case where a masking process is performed on a volume to display only a part of the volume. For example, as shown in FIG. 10A, masking process is performed so that only a partial region of the whole volume data can be displayed as a mask region. Accordingly, the outline of an inner wall surface of the colon can be displayed as shown in FIG. 10B, when masking process is performed which designates a mask region to exclude a volume region blocking the view in front of a region of interest of an image of the colon obtained by the ray casting method. As a result, it is possible to observe and detect a lesion that appears on the inner wall surface such as a polyp.

FIGS. 11A and 11B show other examples of the mask region. As the mask region can be any three-dimensional shape, a surface of the mask region can form an arbitrary section or a plurality of arbitrary sections.

FIGS. 12A and 12B are illustrations showing the case where an arbitrary sectional plane of a volume is displayed by MPR (Multi Planar Reconstruction). For example, as shown in FIG. 12A, an arbitrary sectional plane 102 is extracted from the volume data 101 so that a sectional plane 102 can be displayed. FIG. 12B shows an image of the periphery of the colon displayed by MPR. Incidentally, the black part in FIG. 12B expresses air existing in the lumen of the colon.

Next, technical terms for regions concerning a tubular tissue will be described with reference to FIG. 13. As for a tubular tissue 111 such as a colon inside of a human body, a region numbered 112 is called "lumen", which is filled by air and/or fluid. A wall surface numbered 113 is called "inner wall surface", on which, for instance, a polyp may be seen. A region numbered 114 is called "inside of wall", and a region numbered 115 is called "inside and periphery of wall". The inside of wall constitutes the tissue itself. The periphery of wall includes neighboring tissues and substances surrounding the tubular tissue. Accordingly, the portion displayed by the conventional ray casting is "inner wall surface", which is generally referred to as boundary surface, whereas the portion displayed by MPR is "inside of wall", which is a solid portion of the volume.

Ray casting allows viewing the external form of a tubular tissue. However, it is not suitable for displaying the inside of wall of the tissue.

In the case where a masking process is performed so that only a part of the volume is displayed, the outline of the tubular tissue including the inner wall surface can be observed, but the inside and periphery of the wall are hardly recognized. On the other hand, in the case where an arbitrary sectional plane of a volume is displayed by MPR, the outline of the tubular tissue including the inner wall surface is hardly recognized, though the inside and periphery of the wall of the tubular tissue can be observed. In addition, when a tubular tissue having many curvatures such as a colon or a blood vessel is sliced by a plane, the tubular tissue cannot be inspected easily because it is difficult to understand the positional relation between the tubular tissue and a planar image by observing them simultaneously.

For this reason, it is difficult to observe and detect a lesion that appears in the inside of the intestinal wall such as an infiltrating tumor. It is also difficult to understand the position of the lesion. Moreover, it requires additional diagnosis apart from the diagnosis of the polyp.

SUMMARY OF THE INVENTION

An object of the present invention is to provide an image display method and an image display program by which the inside of wall of a tubular tissue and the inner wall surface thereof can be observed simultaneously.

An image display method for visualizing a tubular tissue, comprising three-dimensional image processing for generating a three-dimensional image of a region of said tubular-tissue that is obtained by slicing said tubular tissue by a predetermined cutting surface along a path representing a center line of said tubular tissue, and two-dimensional image processing for generating a two-dimensional image of said predetermined cutting surface, wherein said three-dimensional image and said two-dimensional image are synthesized to be displayed.

According to this configuration, because display of an image of the tubular tissue is executed by three-dimensional image processing performed over a region that is obtained by slicing the tubular tissue by a predetermined cutting surface along a path representing a center line of the tubular tissue, and by two-dimensional image processing performed over the predetermined cutting surface, both the inside of a wall of the tubular tissue and the inner wall surface of the tubular tissue can be displayed simultaneously. Accordingly, the inside of the wall of the tubular tissue and the inner wall surface of the tubular tissue can be observed simultaneously.

In the image display method according to the invention said three-dimensional image processing is a volume rendering processing. In the image display method according to the invention, said three-dimensional image processing is a surface rendering processing.

In the image display method according to the invention said tubular tissue is curved. In the image display method according to the invention, said two-dimensional image processing is a processing which generates a curved planar reconstruction image. In the image display method according to the invention, said two-dimensional image processing is a processing which generates said two-dimensional image from an image data which is different from an image data used in said three-dimensional image processing, or from an image data combining an image data which is used in said three-dimensional image processing and an image data which is different from the image data used in said three-dimensional image processing. In the image display method according to the invention, said two-dimensional image processing is a processing which generates at least any one of a thickened maximum intensity projection image, a thickened minimum intensity projection image and a thickened curved planer reconstruction image.

In the image display method according to the invention, said predetermined cutting surface is represented by a shape including a radius of a sector, the center of which is on said path. In the image display method according to the invention, a center angle of said sector can be changed dynamically.

According to this configuration, an image of the tubular tissue can be displayed while the center angle of the sector is changed dynamically to move the predetermined cutting surface. Accordingly, the tubular tissue can be displayed while the angle between the path and the predetermined cutting surface along the path is changed dynamically. As a result, the inside of the wall of the tubular tissue and the inner wall surface of the tubular tissue can be observed simultaneously in a wide range.

In the image display method according to the invention, said tubular tissue is visualized within a region, said region being extracted with said path as a center of said region.

In the image display method according to the invention, said predetermined cutting surface includes said path. In the image display method according to the invention, said predetermined cutting surface is positioned at a predetermined distance from said path.

In the image display method according to the invention, said three-dimensional image processing and said two-dimensional image processing are performed by network distributed processing. In the image display method according to the invention, said three-dimensional image processing and said two-dimensional image processing are performed by using a graphic processing unit.

A computer-readable medium including a processor connected to at least one of an image processing portion, a volume data generating portion and a display device, said processor contains a set of instructions for image display to visualize a tubular tissue, said set of instructions comprising three-dimensional image processing for generating a three-dimensional image of a region of said tubular-tissue that is obtained by slicing said tubular tissue by a predetermined cutting surface along a path representing a center line of said tubular tissue, and two-dimensional image processing for generating a two-dimensional image of said predetermined cutting surface, wherein said three-dimensional image and said two-dimensional image are synthesized to be displayed.

BRIEF DESCRIPTION OF THE DRAWINGS

FIG. 3 is a flow chart showing contents of processing in the image display method according to the first embodiment of the invention.

FIGS. 7A and 7B are views for explaining the animation and interactive change of the predetermined cutting surface in an image display method according to a third embodiment of the invention.

DESCRIPTION OF THE PREFERRED EMBODIMENTS

First Embodiment

Figure 1:
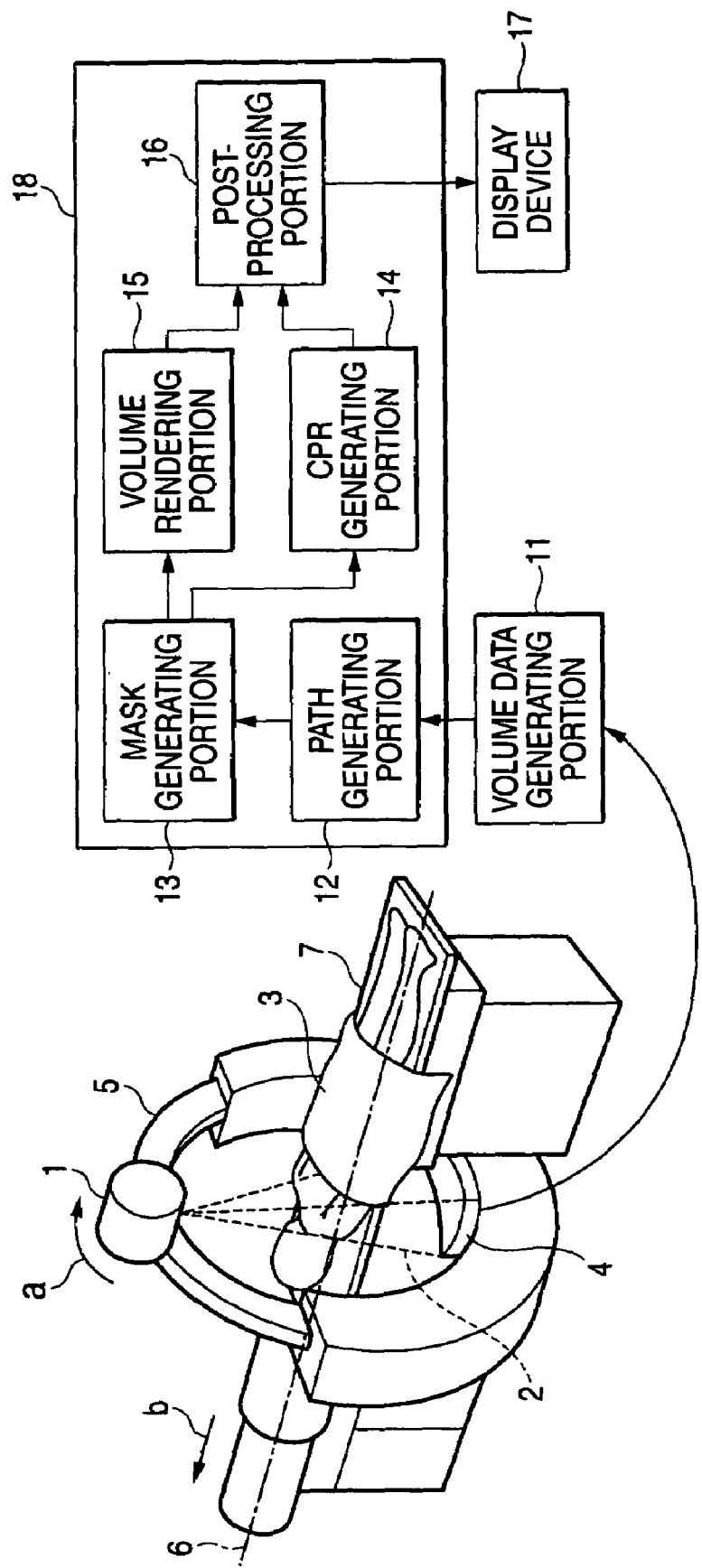
FIG. 1 is a schematic block diagram of a computed tomography scanner in which an image processing apparatus explaining a first embodiment of the invention is used.

FIG. 1 a schematic block diagram of a computed tomography scanner in which an image processing apparatus explaining a first embodiment of the invention is used. The computed tomography scanner is used for visualizing a tubular tissue of a subject, for example. A pyramid-like X-ray beam 2 having edge beams which is represented by chain lines in FIG. 1 is emitted from an X-ray source 1. The X-ray beam 2 is applied on an X-ray detector 4 after transmitting through the subject, for example, a patient 3. In this embodiment, the X-ray source 1 and the X-ray detector 4 are disposed in a ring-like gantry 5 so as to face each other. The ring-like gantry 5 is supported by a retainer not shown in FIG. 1 so as to be rotatable (see the arrow "a") about a system axis 6 which passes through the center point of the gantry.

In this embodiment, the patient 3 is lying on a table 7 through which the X-rays are transmitted. The table 7 is supported by a retainer which is not shown in FIG. 1 so as to be movable (see the arrow "b") along the system axis 6.

Thus a measuring system is configured so that the X-ray source 1 and the X-ray detector 4 are rotatable about the system axis 6 and movable along the system axis 6 relatively to the patient 3. Accordingly, X-rays can be cast on the patient 3 at various projection angles and in various positions with respect to the system axis 6. An output signal from the X-ray detector 4 when the X-rays are cast on the patient 3 are supplied to a volume data generating portion 11 and converted into a volume data.

In sequence scanning, the patient 3 is scanned in accordance with each sectional layer of the patient 3. When the patient 3 is scanned, while the X-ray source 1 and the X-ray detector 4 rotate around the patient 3 about the system axis 6 as its center, the measuring system including the X-ray source 1 and the X-ray detector 4 captures a large number of projections to scan each two-dimensional sectional layer of the patient 3. A tomogram displaying the scanned sectional layer is reconstructed from the measured values acquired at that time. While the sectional layers are scanned continuously, the patient 3 is moved along the system axis 6 every time the scanning of one sectional layer is completed. This process is repeated until all sectional layers of interest are captured.

On the other hand, during spiral scanning, the table 7 moves along the direction of the arrow "b" continuously while the measuring system including the X-ray source 1 and the X-ray detector 4 rotates about the system axis 6. That is, the measuring system including the X-ray source 1 and the X-ray detector 4 moves on a spiral track continuously and relatively to the patient 3 until the region of interest of the patient 3 is captured completely. In this embodiment, signals of a large number of successive sectional layers in the abdominal area of the patient 3 are supplied to a volume data generating portion 11 by the computed tomography scanner shown in FIG. 1.

A set of volume data generated by the volume data generating portion 11 is led to a path generating portion 12 in an image processing portion 18. Incidentally, volume data can be displayed on a display device 17 if the volume data set is supplied to the display device 17. The path generating portion 12 generates a path determining the center line of a subject of observation such as a colon (tubular tissue). Alternatively, the path generating portion 12 may set the line as the path which is input through a mouse, for example, by a user viewing a volume rendering image displayed on the display device 17. The path generated by the path generating portion 12 is supplied to a mask generating portion 13.

When, for example, inside of the colon is the region of interest, the mask generating portion 13 sets a region equivalent to the outer wall of the colon as a mask region, on the basis of the path supplied from the path generating portion 12. Then, the mask generating portion 13 performs three-dimensional image processing on a region that is obtained by slicing the colon by a predetermined cutting surface along the path representing the center line of the colon. Then, the mask generating portion 13 supplies the set mask region to a volume rendering portion 15 and a CPR generating portion 14. Based on data of the mask region given from the mask generating portion 13, the CPR generating portion 14 generates an arbitrary curved section, which is a slicing section in direction along the path of the tubular tissue, including the center line of the subject of observation such as the colon. Then the CPR generating portion 14 performs two-dimensional image processing on the slicing section. The CPR generating portion 14 can generate a curved slicing section continuous along a curved internal organ such as a colon or a blood vessel by extracting a curved section.

The volume rendering portion 15 performs a masking process on the mask region given from the mask generating portion 13 and calculates visualized data directly, for example, without the contour extraction process of the colon. The visualized data calculated by the volume rendering portion 15 and the curved section generated by the CPR generating portion 14 are supplied to a post-processing portion 16, synthesized in such a manner that a CPR sectional image is attached to the masked surface of the volume rendering image, and then displayed on the display device 17.

A processor is connected to at least one of the image processing portion 18, the volume data generating portion 11 and the display device 17, and controls a system including the image processing portion 18, the volume data generating portion 11 and the display device 17.

As described above, in accordance of the image display method of this embodiment, a path representing the center line of a tubular tissue is generated, a volume rendering image corresponding to a region that is obtained by slicing the tubular tissue by a predetermined cutting surface along the path and a CPR image corresponding to the slicing section are generated, and the CPR image attached to the masked surface of the volume rendering image is displayed. In this manner, both the inside of the wall of the tubular tissue and the inner wall surface of the tubular tissue can be displayed simultaneously. Accordingly, the inside of the wall of the tubular tissue and the inner wall surface of the tubular tissue can be observed simultaneously, so that, for example, a polyp invading the inside of wall of the tubular tissue can be detected accurately.

Moreover, a lesion such as a polyp which appears on the outline of the inner wall surface and a lesion such as an infiltrating tumor which appears in the inside of the intestinal wall can be observed simultaneously. Accordingly, the status of the lesions can be observed in detail.

Figure 2A:
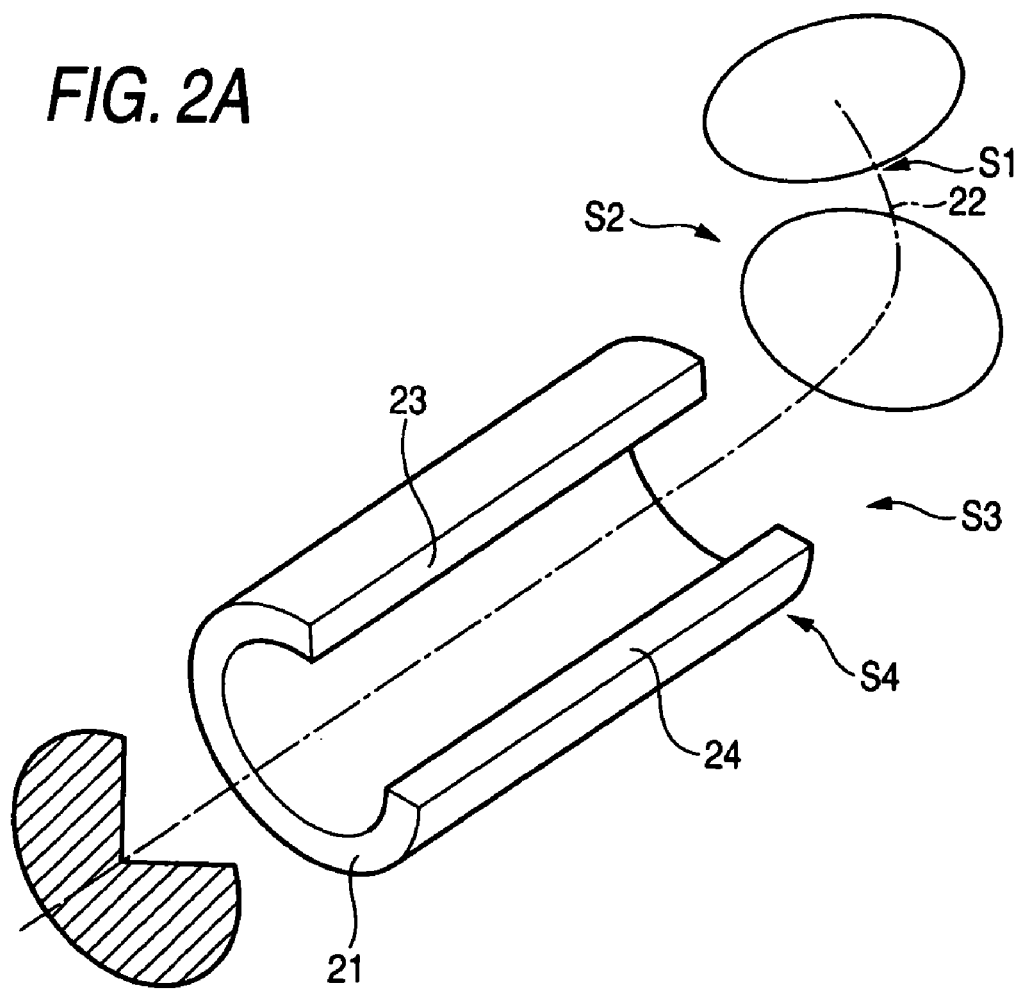
FIGS. 2A and 2B are views for explaining respective steps in the image display method according to the first embodiment of the invention.
Figure 2B:
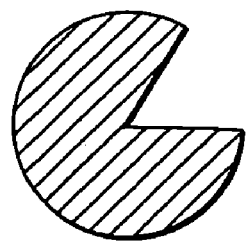

FIGS. 2A and 2B are views for explaining respective steps in the image display method according to this embodiment of the invention. FIG. 3 is a flow chart showing contents of processing in the image display method according to this embodiment of the invention. The image display method according to this embodiment will be described with reference to FIGS. 2A, 2B and 3. Incidentally, the reference symbols S1, S2, etc. correspond to the step numbers S1, S2, etc. in the flow chart of FIG. 3.

In the image display method according to this embodiment, a subject of observation is a curved tubular tissue such as a colon and a blood vessel. FIG. 2A shows a shape of a curved cylinder 21 as a subject of observation partially cut open at a predetermined angle. In the image display method according to this embodiment, the inside and section of the curved cylinder 21 are displayed as the following steps. First, a path 22 representing the center line of the curved cylinder 21 is acquired in step S1. The path 22 can be set automatically when the curved cylinder 21 is designated as a subject of observation. Alternatively, the path 22 may be set by means of a GUI (Graphical User Interface) while the user is viewing the volume rendering image displayed on the display device 17.

Then, in step S2, a region as a subject of observation of the curved cylinder 21 is extracted with the path 22 as its center. For example, a region where a lesion such as a polyp possibly exists is extracted as a region of interest based on the volume rendering image displayed on the display device 17. Then, in step S3, sections 23 and 24 are generated assuming that the extracted region is cut open along the path 22. In FIGS. 2A and 2B, a slicing plane perpendicular to the path 22 of the curved cylinder 21 forms a sector. The sections 23 and 24 are included in parts of two radii of the sector respectively.

In this case, the sections 23 and 24 are curved surfaces along the curvature of the curved cylinder 21. Accordingly, in step S4, CPR images are synthesized on the curved sections 23 and 24. That is, sectional images of the curved cylinder 21 are generated along the path 22 and displayed as being attached to the masked surface of the volume rendering image.

Figure 4A:
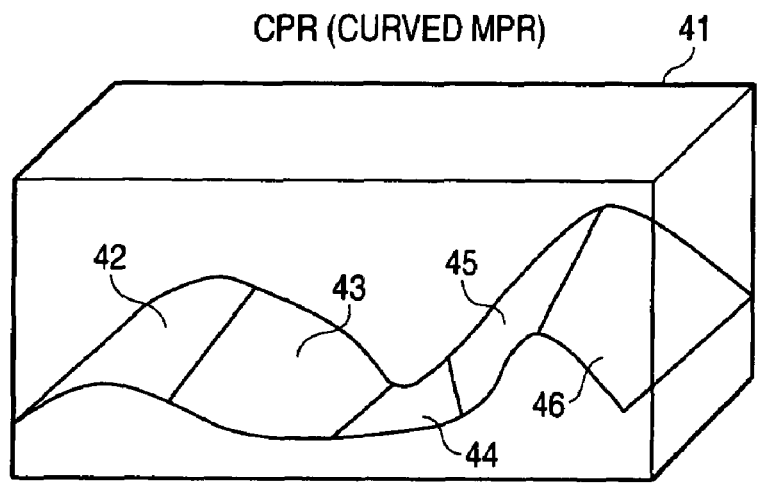
FIGS. 4A and 4B show examples in which arbitrary slicing curved surfaces of a volume are displayed by CPR (Curved MPR) in the image display method according to the first embodiment of the invention.
Figure 4B:

FIGS. 4A and 4B show examples in which arbitrary slicing curved surfaces of a volume are displayed by CPR (Curved MPR). According to CPR, arbitrary slicing curved surfaces 42, 43, 44, 45 and 46 inside a volume 41 are set as shown in FIG. 4A so that images of the slicing surfaces can be displayed. FIG. 4B shows a CPR image generated along a path 47 which is set along the center line of a colon. As the CPR image can represent the curved surface, curved internal organs such as a colon and a blood vessel can be observed.

Figure 5:
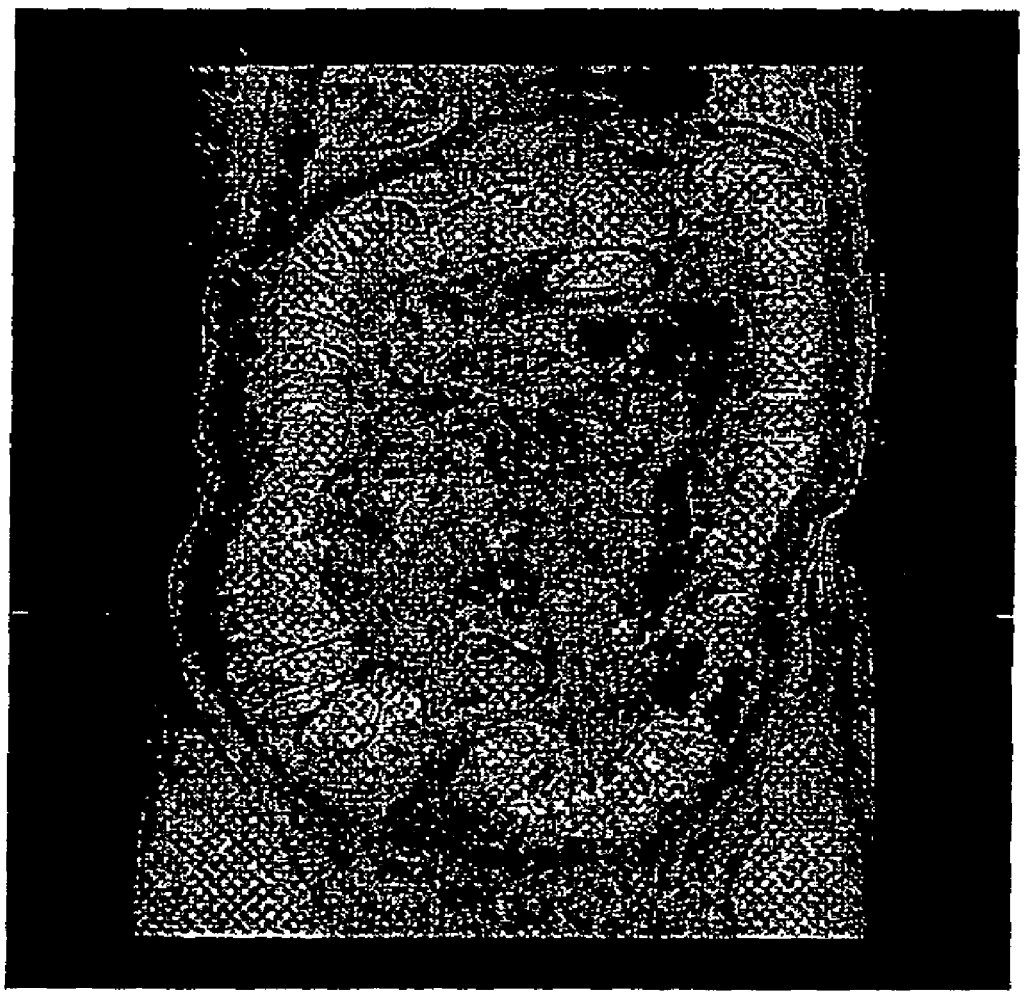
FIG. 5 shows an example in which a CPR image is synthesized with a masked volume rendering image in the image display method according to the first embodiment of the invention.

FIG. 5 shows an example in which the CPR image is synthesized with a masked volume rendering image in the image display method according to this embodiment. The CPR image and the masked volume rendering image can be displayed simultaneously in this manner, being superposed on each other. Accordingly, even in the case where a subject of observation is a curved tubular tissue such as a colon and a blood vessel, information concerning the outline of the tubular tissue and information concerning the periphery of the tubular tissue can be observed simultaneously. For example, while a polyp in the inside of the colon can be detected early on the basis of the outline of the tubular tissue, it is observed in detail how the tissue under the polyp is invaded in the inside by using the information concerning the inside of the wall.

In the masked volume rendering image, the boundary surface of the mask region is not represented with the actual values of voxels existing on the surface. On the other hand, CPR image can be generated independently of the volume rendering image. Accordingly, this embodiment is substantially the same as performing volume rendering only within the mask region and forming the CPR image on the surface of the mask region.

On this occasion, when a part of the CPR image is made transparent, a part of the volume rendering image behind the CPR image is displayed through the transparent part as a window. In this embodiment, for example, a part of the CPR image having a CT value representing air is made transparent so that the inner wall surface of the tubular tissue can be drawn.

The following techniques are methods for making part of the CPR image transparent. These techniques are a technique (1) in which a voxel value satisfying a certain condition is made transparent, a technique (2) in which a range designated by three-dimensional masking is made transparent, a technique (3) in which within a range calculated based on the path is made transparent, and (4) any combination of the three techniques. In this embodiment, the technique of excluding the part of air as a transparent part corresponds to the technique (1) and the technique of not generating the CPR image out of the region where the region extraction of the colon is performed corresponds to the technique (2).

Second Embodiment

Figure 6A:
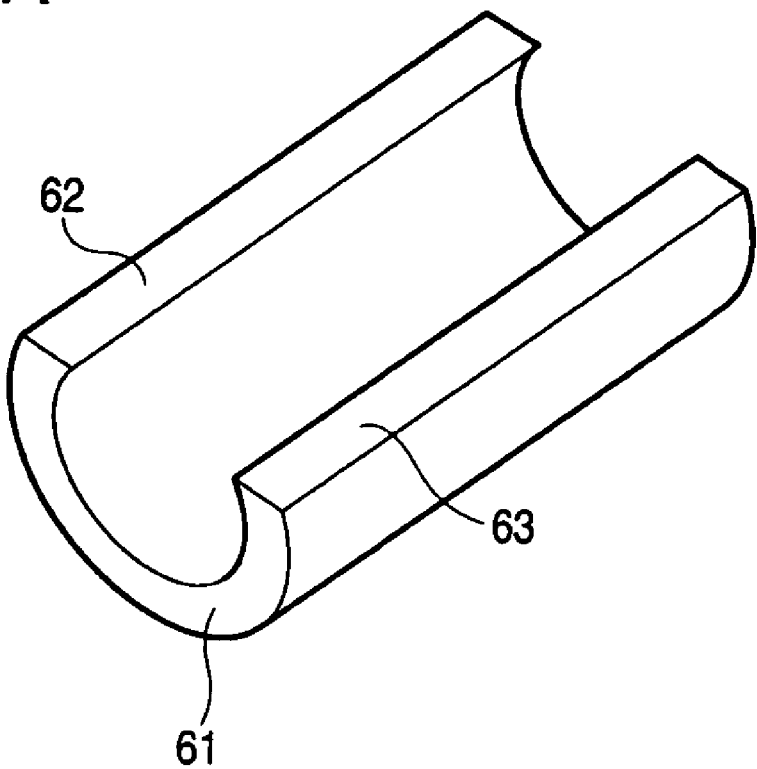
FIGS. 6A and 6B show an example in which a tubular tissue 61 is sliced by a plane that does not include the center line of the tubular tissue 61 in an image display method according to a second embodiment of the invention.
Figure 6B:
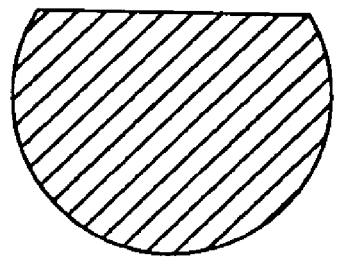

FIGS. 6A and 6B show an example of a tubular tissue 61 being sliced by a plane which does not include the center line of the tubular tissue 61, as an image display method according to a second embodiment of the invention. In this embodiment, predetermined cutting surfaces 62 and 63 of the tubular tissue 61 are on the plane which does not include the center line of the tubular tissue 61. A user can designate the position and direction of each predetermined cutting surface by using an interface such as mouse while viewing a volume rendering image displayed on the display device 17.

As described above, in accordance with this embodiment, the predetermined cutting surface can be changed dynamically by means of a GUI (Graphical User Interface), and a CPR image can be attached to the predetermined cutting surface. Accordingly, even when a subject of observation is a zigzag-curved tubular tissue such as a colon, information concerning the shape of the inside of the tubular tissue and the periphery of the tubular tissue can be observed simultaneously in a wide range.

Third Embodiment

FIGS. 7A and 7B are views for explaining the animation and interactive change of the predetermined cutting surface in an image display method according to a third embodiment of the invention. FIG. 7A shows an example in which a tubular tissue 71 is sliced in such a manner that intersections between a plane perpendicular to the center line of the tubular tissue 71 and two predetermined cutting surfaces form two radii of a sector with a center angle of $2\pi-\theta$. In FIG. 7A, the predetermined cutting surfaces are rotated in direction of the arrow 72 with the constant angle. The CPR image of the predetermined cutting surfaces is displayed as an animation on the display device 17 with the rotation of the predetermined cutting surfaces, and the direction and the velocity of rotation can be changed interactively by means of a GUI.

FIG. 7B shows an example in which a tubular tissue 73 is sliced in such a manner that intersections between a plane perpendicular to the center line of the tubular tissue 73 and two predetermined cutting surfaces form two radii of a sector with a center angle of the sector being enlarged to $2\pi-\phi_1$, $2\pi-\phi_2$, $2\pi-\phi_3$, . . . in direction of the arrow 74. The CPR image of the predetermined cutting surfaces is displayed as an animation on the display device 17 with the enlargement of the angle, and the velocity of rotation can be changed interactively by means of a GUI.

Figure 8:
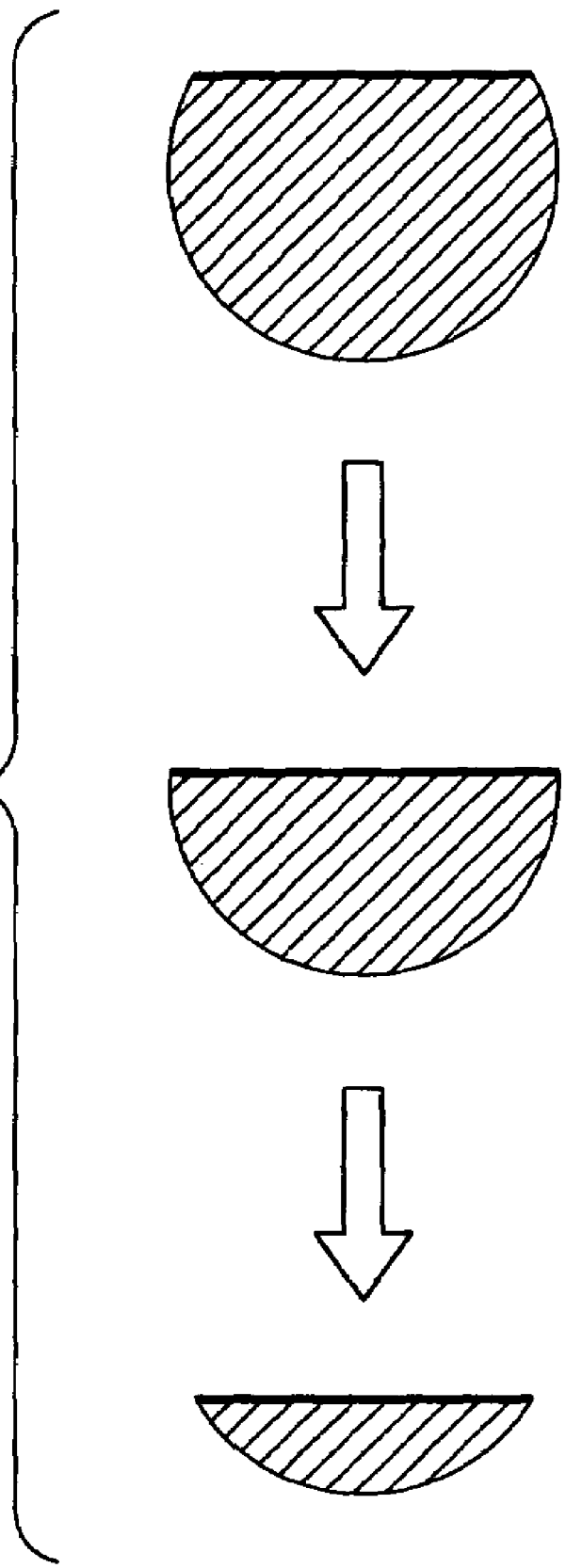
FIG. 8 is a view for explaining another example of the animation pattern in the image display method according to the third embodiment of the invention.
Figure 9:
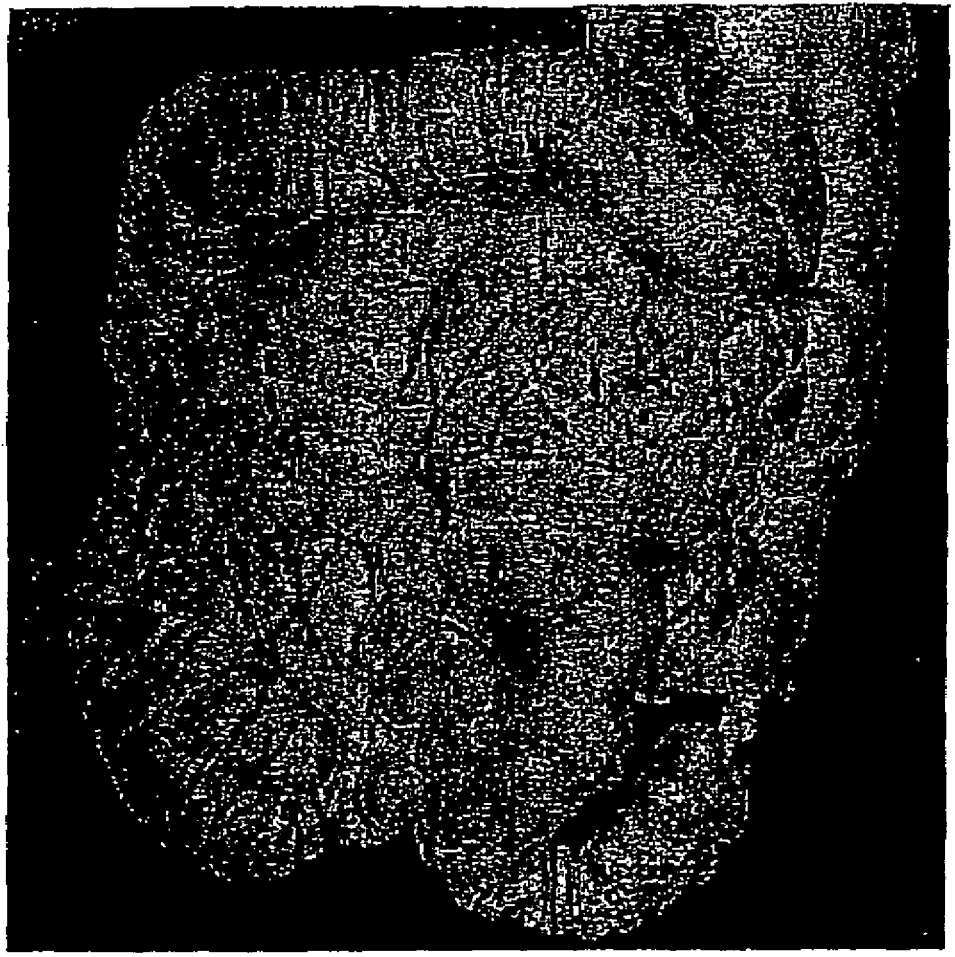
FIG. 9 shows an example displaying a colon by a ray casting method when visualizing a tubular tissue inside a human body.
Figure 10A:
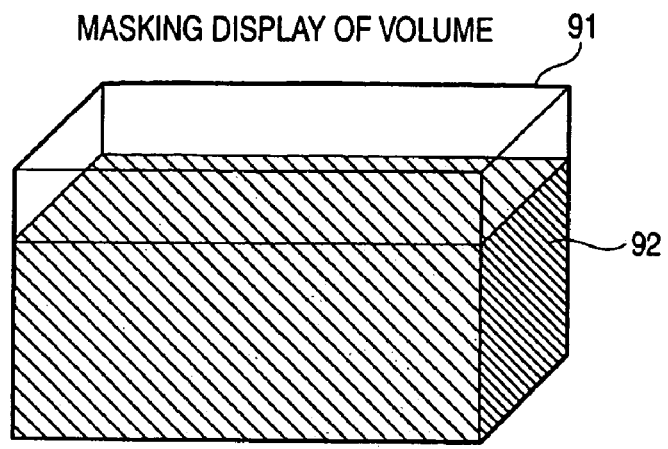
FIGS. 10A and 10B are views for explaining the case where a masking process is performed over a volume so that only a part of the volume can be displayed.
Figure 10B:
Figure 11A:
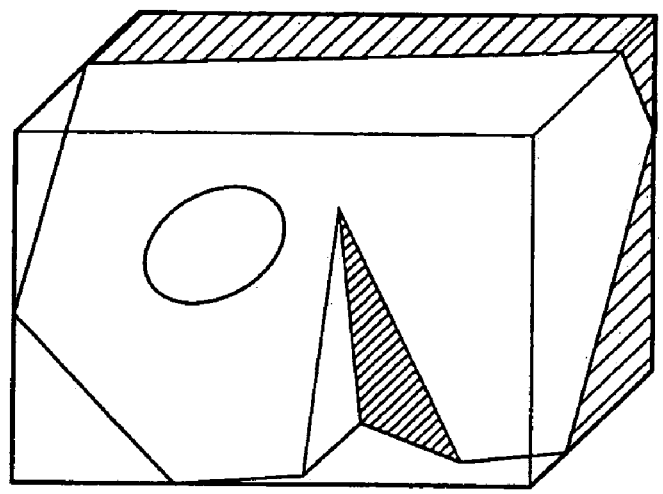
FIGS. 11A and 11B are views for explaining the case where a masking process is performed over a volume so that an arbitrary section of the volume can be displayed.
Figure 11B:
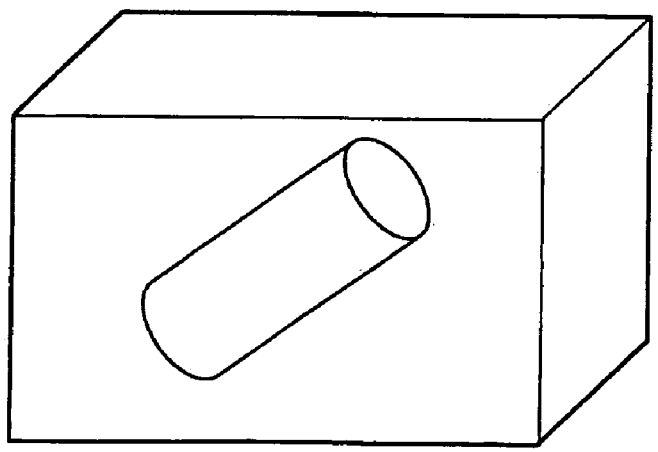
Figure 12A:
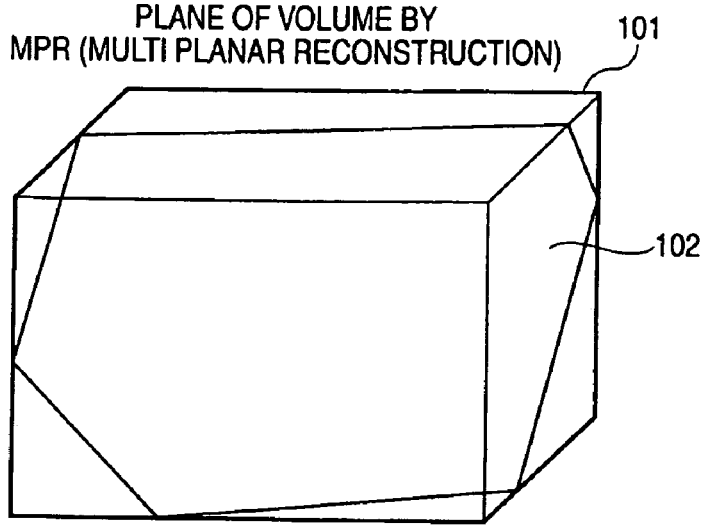
FIGS. 12A and 12B are views for explaining the case where an arbitrary planar section of a volume is displayed by MPR (Multi Planar Reconstruction).
Figure 12B:
Figure 13:
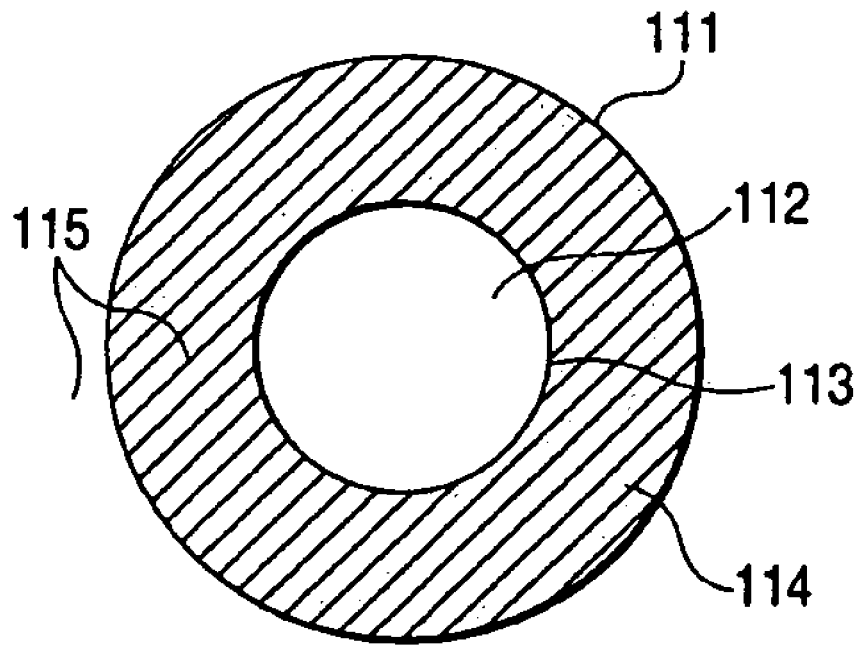
FIG. 13 is a view for explaining technical terms used for regions concerning a tubular tissue.

FIG. 8 shows another example of the animation pattern. In this case, the animation is shown in which the distance between the path and a straight line representing a plane is changed, with a ribbon-like plane represented by a set of straight lines at a predetermined distance from the path.

As described above, in accordance with the image display method of this embodiment, the CPR image of the predetermined cutting surfaces is displayed as an animation on the display device 17 with the rotation of the predetermined cutting surfaces, and the direction or the velocity of rotation can be changed interactively by means of GUI. Accordingly, the subject of observation can be observed in a wide range not being missed by the user, so that small lesions such as a polyp and an infiltrating part in the inside of the wall of the tubular tissue and in the inner wall surface of the tubular tissue can be detected easily.

In the image display method according to the described embodiments, an example of the image taken mainly by a parallel projection method is shown. However, an image taken by any other projection method such as a cylindrical projection method and a perspective projection method can be used in the image display method according to the invention. Further, in the described embodiments, an example of the CPR image of CT being superposed on the volume rendering image of CT is shown. However, images obtained from a plurality of medical imaging apparatuses can be used freely in the image display method according to the invention. For example, a CPR image obtained from an MRI apparatus, a PET (Positron-Emission Tomography) apparatus or an ultrasonic diagnostic apparatus may be superposed on a volume rendering image of MRI, and an image synthesized by the combination of the CPR images may be superposed on the volume rendering image of MRI. Further, the combination may be of a plurality of images obtained from one identical medical imaging apparatus.

Although in the image display method according to each of the embodiments, the images are superposed on each other in the same position, the images may be superposed on each other in such a manner that the position, angle or scale factor is shifted by user's operation or calculation. In this case, position adjustment of images obtained by a plurality of apparatuses can be performed, and it is possible to visualize the portion which could not be observed directly.

Although in each of the embodiments, examples concerning the inner wall surface and the inside of the wall are displayed, the image display method may be applied to display respectively a surface such as an outer wall surface and a peripheral portion including the inside of the wall, that is, a surface representing a certain boundary and a section obtained by slicing the solid body of the inside of a volume.

Although in each of the described embodiments, volume rendering is used for displaying the inner wall surface and the inside of the wall, either or both of the inner wall surface and the inside of the wall may be calculated by surface rendering. The surface rendering is a method for displaying a three-dimensional image by using plane elements such as polygons.

In this case, the plane elements can be obtained from the inner wall surface and the predetermined cutting surfaces.

A calculation process for superposing the CPR image on volume rendering image can be performed by a GPU (Graphic Processing Unit). The GPU is an arithmetic processing unit designed to be specialized particularly for image processing compared with a general-purpose CPU. Generally, the GPU is mounted in a computer separately from the CPU.

In the image processing method according to each of the embodiments, three-dimensional image processing and two-dimensional image processing may be performed by network distributed processing. The calculation for volume rendering can be divided into parts, for example by a predetermined angle range, an image region, or a volume region, and then the calculation results will be combined on one another. Accordingly, the calculation may be performed by parallel processing, network distributed processing, an exclusive processor or a combination of these.

The image processing method according to each of the embodiments can also be applied to MIP (Maximum Intensity Projection) which is an image processing method using the maximum voxel value obtained from voxels on a projected virtual ray. MIP can be performed relatively by a simple calculation among the volume rendering methods, and there are methods using the minimum voxel value, the average voxel value and the additional voxel value as processes similar to MIP. Particularly the method using the minimum voxel value is referred to as MINIP (Minimum Intensity Projection). The image processing method according to each of the embodiments may be also applied to thickened MIP or thickened MINIP in which MIP processing is performed after a section such as MPR is extracted with some thickness.

Although in each of the described embodiments, the CPR image is used as an example of the image displaying the inside of the tissue, not only the CPR image but an arbitrary curved surface provided in accordance with the shape of each predetermined cutting surface may be used.

In each of the described embodiments, when a numerical value needs to be set for determining the predetermined cutting surface, the numerical value can be determined by a program or designated by the user. Particularly, the user can change the numerical value dynamically by dragging of a mouse or by using a GUI such as a slider bar or a keyboard. Animation display is also available by changing the numerical value continuously.

According to the invention, because display of an image of the tubular tissue is executed by three-dimensional image processing of a region obtained in such a manner that the tubular tissue is sliced by a predetermined cutting surface along a path representing a center line of the tubular tissue and two-dimensional image processing of the predetermined cutting surface, the inside of a wall and the inner wall surface of the tubular tissue can be displayed. Accordingly, the inside of the wall and the inner wall surface of the tubular tissue can be observed simultaneously.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An image display method for visualizing a tubular tissue, comprising receiving volume data of the tubular tissue, wherein the volume data is obtained based on a scan of the tubular tissue using one of a tomographic scanner and a magnetic resonance imaging scanner;

three-dimensional image processing for generating, based on said volume data, a masked volume rendering image of an inner wall surface region of said tubular-tissue that is obtained by slicing said tubular tissue by a predetermined curved cutting surface that is curved along a curved path representing a center line of said tubular tissue, two-dimensional image processing for generating a two-dimensional image of said predetermined curved cutting surface, wherein the curved cutting surface conforms to a masked surface of the masked volume rendering image, making a part of said masked volume rendering image transparent, making a part of said two-dimensional image transparent, and synthesizing said masked volume rendering image with said two-dimensional image, wherein the step of synthesizing includes synthesizing the transparent part of the masked volume rendering image with the transparent part of the two-dimensional image, which is determined by opacity of the volume data used in masked volume rendering, and wherein said masked volume rendering image and said two-dimensional image are synthesized to be displayed as a synthesized image, and wherein a part of said masked volume rendering image that is behind said two-dimensional image in the synthesized image is displayed through the transparent part of said two-dimensional image.

2. The image display method according to claim 1, wherein said three-dimensional image processing is a volume rendering processing.

3. The image display method according to claim 1, wherein said three-dimensional image processing is a surface rendering processing.

4. The image display method according to claim 1, wherein said tubular tissue is curved.

5. The image display method according to claim 4, wherein said two-dimensional image processing is a processing which generates a curved planar reconstruction image.

6. The image display method according to claim 4, wherein said two-dimensional image processing generates said two-dimensional image from an image data which is different from an image data used in said three-dimensional image processing, or from an image data combining an image data which is used in said three-dimensional image processing and an image data which is different from the image data used in said three-dimensional image processing.

7. The image display method according to claim 4, wherein said two-dimensional image processing is a processing which generates at least any one of a thickened maximum intensity projection image, a thickened minimum intensity projection image and a thickened curved planer reconstruction image.

8. The image display method according to claim 1, wherein said predetermined curved cutting surface includes a radius of a sector, the center of which is on said path.

9. The image display method according to claim 8, wherein a center angle of said sector can be changed dynamically.

10. The image display method according to claim 1, wherein said tubular tissue is visualized within a region extracted with said path as a center of said region.

11. The image display method according to claim 1, wherein said predetermined curved cutting surface includes said path.

12. The image display method according to claim 1, wherein said predetermined curved cutting surface is positioned at a predetermined distance from said path.

13. The image display method according to claim 1, wherein said three-dimensional image processing and said two-dimensional image processing are performed by network distributed processing.

14. The image display method according to claim 1, wherein said three-dimensional image processing and said two-dimensional image processing are performed by using a graphic processing unit.

15. A medical imaging apparatus including a processor connected to at least one of an image processing portion, a volume data generating portion and a display device, said processor contains a set of instructions for image display to visualize a tubular tissue, said processor executing said set of instructions such that said medical imaging apparatus performs steps comprising three-dimensional image processing for generating a masked volume rendering image of an inner wall surface region of said tubular-tissue that is obtained by slicing said tubular tissue by a predetermined curved cutting surface that is curved along a curved path representing a center line of said tubular tissue, two-dimensional image processing for generating a two-dimensional image of said predetermined curved cutting surface, wherein the curved cutting surface conforms to a masked surface of the masked volume rendering image, making a part of said masked volume rendering image transparent, making a part of said two-dimensional image transparent, and synthesizing said masked volume rendering image with said two-dimensional image, wherein the step of synthesizing includes synthesizing the transparent part of the masked volume rendering image with the transparent part of the two-dimensional image, which is determined by opacity of the volume data used in masked volume rendering, and wherein said masked volume rendering image and said two-dimensional image are synthesized to be displayed as a synthesized image, and wherein a part of said masked volume rendering image that is behind said two-dimensional image in the synthesized image is displayed through the transparent part of said two-dimensional image.

* * * * *

UNITED STATES PATENT AND TRADEMARK OFFICE
CERTIFICATE OF CORRECTION

| | | |
|---|---|---|
| PATENT NO. | : 7,620,224 B2 | Page 1 of 1 |
| APPLICATION NO. | : 11/105647 | |
| DATED | : November 17, 2009 | |
| INVENTOR(S) | : Kazuhiko Matsumoto | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 827 days.

Signed and Sealed this

Twenty-sixth Day of October, 2010

David J. Kappos
*Director of the United States Patent and Trademark Office*